United States Patent
Bhutani et al.

(10) Patent No.: US 11,307,881 B1
(45) Date of Patent: Apr. 19, 2022

(54) SYSTEMS FOR GENERATING SUGGESTIONS WITH KNOWLEDGE GRAPH EMBEDDING VECTORS

(71) Applicant: Adobe Inc., San Jose, CA (US)

(72) Inventors: Ripul Bhutani, Lynnwood, WA (US);
Oliver Markus Michael Brdiczka, San Jose, CA (US); Doo Soon Kim, San Jose, CA (US); Aliakbar Darabi, Newcastle, WA (US); Yinglan Ma, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/095,290

(22) Filed: Nov. 11, 2020

(51) Int. Cl.
*G06F 3/0482* (2013.01)
*G06F 9/451* (2018.01)
*G06N 5/02* (2006.01)
*G06F 16/23* (2019.01)

(52) U.S. Cl.
CPC .......... *G06F 9/453* (2018.02); *G06F 16/2379* (2019.01); *G06N 5/02* (2013.01); *G06F 3/0482* (2013.01)

(58) Field of Classification Search
CPC .... G06F 9/453; G06F 16/2379; G06F 3/0482; G06N 5/02
See application file for complete search history.

(56) References Cited

U.S. PATENT DOCUMENTS

| | | | | |
|---|---|---|---|---|
| 9,881,010 | B1 * | 1/2018 | Gubin | G06F 16/93 |
| 10,943,171 | B2 * | 3/2021 | Wu | G06N 3/04 |
| 2008/0120312 | A1 * | 5/2008 | Reed | G06F 16/68 |
| 2011/0066600 | A1 * | 3/2011 | Cormode | G06F 16/24568 707/689 |
| 2011/0175810 | A1 | 7/2011 | Markovic et al. | |
| 2014/0081892 | A1 * | 3/2014 | Sellers-Blais | G06N 5/04 706/11 |
| 2017/0083495 | A1 * | 3/2017 | Wan | H04L 63/08 |
| 2017/0161619 | A1 * | 6/2017 | Franceschini | G06N 5/022 |
| 2019/0026280 | A1 * | 1/2019 | Aviyam | G06N 20/00 |
| 2019/0034885 | A1 * | 1/2019 | DeLand | G06F 16/437 |
| 2019/0034976 | A1 * | 1/2019 | Hamedi | G06Q 30/0204 |

(Continued)

OTHER PUBLICATIONS

Adobe, , "Create a temporary quick mask", Adobe Photoshop User Guide, Adobe, Inc., 2020 [online] [retrieved Feb. 9, 2021], Retrieved from the Internet <https://helpx.adobe.com/photoshop/using/create-temporary-quick-mask.html#creating_and_editing_a_quick_mask>., May 21, 2020, 6 pages.

(Continued)

*Primary Examiner* — Phenuel S Salomon
(74) *Attorney, Agent, or Firm* — FIG. 1 Patents

(57) ABSTRACT

In implementations of systems for generating suggestions with knowledge graph embedding vectors, a computing device implements a suggestion system to receive input data describing user interactions with an application for editing digital content. The suggestion system generates input embedding vectors based on the user interactions with the application and determines an item based on the input embedding vectors and knowledge graph embedding vectors generated from nodes of a knowledge graph describing a tutorial for editing digital content. The suggestion system generates an indication of the item for display in a user interface of a display device.

20 Claims, 10 Drawing Sheets

(56) References Cited

U.S. PATENT DOCUMENTS

| | | | | |
|---|---|---|---|---|
| 2019/0122111 | A1* | 4/2019 | Min | G06N 3/0481 |
| 2019/0272322 | A1* | 9/2019 | De Ridder | G06F 16/9538 |
| 2019/0392330 | A1* | 12/2019 | Martineau | G06N 5/022 |
| 2020/0005194 | A1* | 1/2020 | Rao | G06N 20/00 |
| 2020/0125575 | A1* | 4/2020 | Ghoshal | G06F 40/247 |
| 2020/0159507 | A1* | 5/2020 | Bodin | G06F 11/3438 |
| 2020/0342055 | A1* | 10/2020 | Patra | G06F 40/237 |
| 2020/0371778 | A1* | 11/2020 | Ni | G06F 8/71 |
| 2020/0380067 | A1* | 12/2020 | Religa | G06F 40/30 |

OTHER PUBLICATIONS

Chen, Long et al., "Understanding user intent in community question answering", WWW'12 Companion: Proceedings of the 21st International Conference on World Wide Web [retrieved Feb. 9, 2021]. Retrieved from the Internet <https://www2012.universite-lyon.fr/proceedings/companion/p823.pdf>., Apr. 2012, 6 pages.

Chen, Muhao et al., "Embedding Edge-attributed Relational Hierarchies", SIGIR'19: Proceedings of the 42nd International ACM SIGIR Conference on Research and Development in Information Retrieval [retrieved Feb. 9, 2021]. Retrieved from the Internet <http://yellowstone.cs.ucla.edu/~muhao/articles/_SIGIR_hre.pdf>., Jul. 2019, 4 pages.

Cheung, Jackie Chi Kit et al., "Sequence clustering and labeling for unsupervised query intent discovery", WSDM '12: Proceedings of the fifth ACM international conference on Web search and data mining [retrieved Feb. 9, 2021]. Retrieved form the Internet <https://www.cs.mcgill.ca/~jcheung/papers/wsdm2012.pdf>., Feb. 2012, 10 pages.

De Cao, Nicola et al., "Question Answering by Reasoning Across Documents with Graph Convolutional Networks", arXiv Preprint [retrieved Feb. 9, 2021]. Retrieved from the Internet <https://arxiv.org/pdf/1808.09920.pdf>., Apr. 7, 2019, 13 pages.

Fatemi, Bahare et al., "Improved Knowledge Graph Embedding using Background Taxonomic Information", arXiv Preprint, arXiv.org [retrieved Feb. 9, 2021]. Retrieved from the Internet <https://arxiv.org/pdf/1812.03235.pdf>., Dec. 7, 2018, 8 pages.

Gangadharaiah, Rashmi et al., "Joint Multiple Intent Detection and Slot Labeling for Goal-Oriented Dialog", Proceedings of the 2019 Conference of the North American Chapter of the Association for Computational Linguistics: Human Language Technologies, vol. 1 (Long and Short Papers) [retrieved Feb. 9, 2021]., Retrieved from the Internet <https://www.aclweb.org/anthology/N19-1055.pdf>., Jun. 2019, 6 pages.

Goo, Chih-Wen et al., "Slot-Gated Modeling for Joint Slot Filling and Intent Prediction", Proceedings of the 2018 Conference of the North American Chapter of the Association for Computational Linguistics Human Language Technologies, vol. 2 (Short Papers) [retrieved Feb. 9, 2021]., Retrieved from the Internet <https://www.aclweb.org/anthology/N18-2118.pdf>., Jun. 2018, 5 pages.

Grover, Aditya et al., "node2vec: Scalable Feature Learning for Networks", arXiv Preprint, arXiv.org [Feb. 3, 2021]. Retrieved from the Internet <https://arxiv.org/pdf/1607.00653.pdf>., Jul. 3, 2016, 10 pages.

Guo, Qi et al., "Exploring Mouse Movements for Inferring Query Intent", SIGIR '08: Proceedings of the 31st annual international ACM SIGIR conference on Research and development in information retrieval [retrieved Feb. 9, 2021]. Retrieved from the Internet <http://www.mathcs.emory.edu/~eugene/papers/sigir2008p-mousemoves.pdf>., Jul. 2008, 2 pages.

Hashemi, Homa B. et al., "Query Intent Detection using Convolutional Neural Networks", 2016 International Conference on Web Search and Data Mining, Workshop on Query Understanding [retrieved Feb. 9, 2021]. Retrieved from the Internet <http://people.cs.pitt.edu/~hashemi/papers/QRUMS2016_HBHashemi.pdf>., Feb. 2016, 5 pages.

Hu, Jian et al., "Understanding user's query intent with Wikipedia", WWW'09: Proceedings of the 18th international conference on World wide web [retrieved Feb. 9, 2021]., Retrieved from the Internet <https://www.researchgate.net/profile/Frederick_Lochovsky/publication/221022043_Understanding_user's_query_intent_with_wikipedia/links/09e41510222022cd4c000000/understanding-users-query-intent-with-Wikipedia.pdf>., Apr. 2009, 10 pages.

Kulkarni, Anagha et al., "Understanding Temporal Query Dynamics", WSDM '11: Proceedings of the fourth ACM international conference on Web search and data mining [retrieved Feb. 9, 2021]. Retrieved from the Internet <https://www.microsoft.com/en-us/research/wp-content/uploads/2016/02/wsdm11-dynamics.pdf>., Feb. 2011, 10 pages.

Liu, Bing et al., "Attention-Based Recurrent Neural Network Models for Joint Intent Detection and Slot Filling", arXiv Preprint, arXiv.org [retrieved Feb. 9, 2021]. Retrieved from the Internet <https://arxiv.org/pdf/1609.01454.pdf>., Sep. 6, 2016, 5 pages.

Perozzi, Bryan et al., "DeepWalk: Online Learning of Social Representations", arXiv Preprint, arXiv.org [retrieved Feb. 9, 2021]. Retrieved from the Internet <https://arxiv.org/pdf/1403.6652.pdf>., Jun. 27, 2014, 10 pages.

Teney, Damien et al., "Graph-Structured Representations for Visual Question Answering", arXiv Preprint, arXiv.org [retrieved Feb. 9, 2021]. Retrieved from the Internet <https://arxiv.org/abs/1609.05600>., Mar. 30, 2017, 17 pages.

Zhang, Qingheng et al., "Multi-view Knowledge Graph Embedding for Entity Alignment", arXiv Preprint, arXiv.org [retrieved Feb. 9, 2021]. Retrieved from the Internet <https://arxiv.org/pdf/1906.02390.pdf>., Jun. 6, 2019, 7 pages.

Zhang, Yuyu et al., "Variational Reasoning for Question Answering with Knowledge Graph", arXiv Preprint, arXiv.org [retrieved Feb. 9, 2021]. Retrieved from the Internet <https://arxiv.org/pdf/1709.04071.pdf>., Nov. 27, 2017, 22 pages.

\* cited by examiner

Fig. 3C

Creating and editing a quick mask

To use Quick Mask mode to create and edit selections quickly, start with a selection and then add to or subtract from it to make the mask. You can also create the mask entirely in Quick Mask mode. Color differentiates the protected and unprotected areas. When you leave Quick Mask mode, the unprotected areas become a selection. Note: A temporary Quick Mask channel appears in the Channels panel while you work in Quick Mask mode. However, you do all mask editing in the image window.

1. Using any selection tool (Quick Selection Tool, Path Selection Tool, Direct Selection Tool), select the part of the image you want to change.
2. Click the Quick Mask mode button in the toolbox. A color overlay (similar to a rubylith) covers and protects the area outside the selection. Selected areas are left unprotected by this mask. By default, Quick Mask mode colors the protected area using a red, 50% opaque overlay.
3. Choose Select > Deselect to deselect the selection. Note: You can convert this temporary mask to a permanent alpha channel by switching to standard mode and choosing Select > Save Selection.

*Fig. 5A*

SYSTEMS FOR GENERATING SUGGESTIONS WITH KNOWLEDGE GRAPH EMBEDDING VECTORS

BACKGROUND

Suggestion systems receive user data, determine relevant items to a user based on the user data, and then suggest the relevant items to the user. Determining which items are relevant to the user generally involves inferring the user's intent based on the user's prior interactions with similar items and/or prior interactions of other users with the similar items. Conventionally, this is accomplished using a machine learning model trained to generate indications of item relevancy using training data describing prior interactions with items by the user or the other users.

However, training machine learning models and using trained machine learning models to generate indications of item relevancy is computationally expensive. As a result, machine-learning based suggestion systems are generally not usable in scenarios which require suggestions in substantially real-time such as suggestions to complete a search query based on a partially entered query. Additionally, conventional suggestion systems are not capable of generating accurate indications of item relevancy in "cold start" scenarios in which training data describing the prior interactions with items by the user or the other users is unavailable.

SUMMARY

Techniques and systems are described for generating suggestions with knowledge graph embedding vectors. In an example, a computing device implements a suggestion system to receive input data describing user interactions with an application for editing digital content. The suggestion system generates input embedding vectors based on the user interactions with the application.

The suggestion system uses the input embedding vectors and knowledge graph embedding vectors generated from nodes of a knowledge graph to determine an item to suggest such as a recommendation or a search suggestion. For example, the knowledge graph describes a tutorial for editing digital content and the suggestion system determines the item by computing a dot product between the input embedding vectors and the knowledge graph embedding vectors. An indication of the item is generated for display in a user interface of a display device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, and 3C illustrate an example of determining an item to suggest based on input embedding vectors and knowledge graph embedding vectors.

FIGS. 5A, 5B, and 5C illustrate an example of generating knowledge graph embedding vectors.

DETAILED DESCRIPTION

Overview

Figure 1:
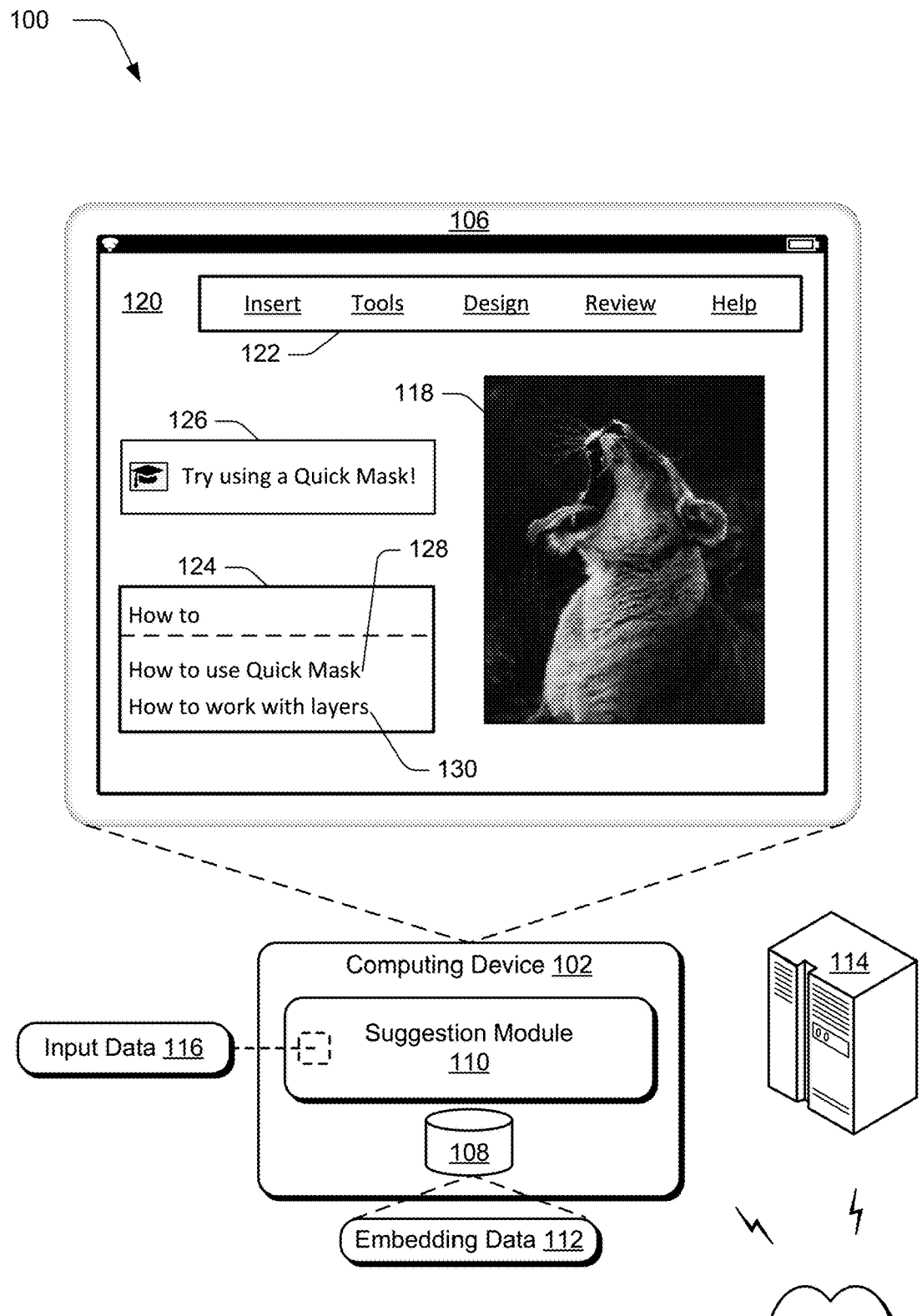
FIG. 1 is an illustration of an environment in an example implementation that is operable to employ digital systems and techniques for generating suggestions with knowledge graph embedding vectors as described herein.

In conventional suggestion techniques, an item is suggested to a user based on a determined likelihood that the item is relevant to the user. To determine whether the item is likely relevant to the user, conventional systems generate indications of item relevancy using machine learning models trained on training data describing the user's prior interactions with similar items and/or training data describing interactions of other users with the similar items. However, conventional suggestion systems are not capable of generating accurate indications of item relevancy in "cold start" scenarios in which the training data is incomplete or unavailable.

To overcome the limitations of conventional systems, techniques and systems are described for generating suggestions with knowledge graph embedding vectors. In one example, a computing device implements a suggestion system to receive input data describing user interactions with an application for editing digital content. In this example, a user interacts with the application as part of editing digital content such as creating or editing a digital image, a digital video, digital audio, and so forth. The suggestion system generates input embedding vectors based on the user interactions with the application. For example, the suggestion system generates the input embedding vectors by representing the user's interactions with application in a low-dimensional vector space.

The suggestion system uses the input embedding vectors and knowledge graph embedding vectors to determine items to suggest to the user of the application such as a recommendation or a search suggestion. To generate the knowledge graph embedding vectors, a knowledge graph is formed for a tutorial. In one example, the tutorial is a tutorial for editing digital content. In this example, the tutorial is included in a document and has a title and procedures that describe how to use digital content editing tools to perform digital content editing objectives.

The suggestion system forms the knowledge graph by representing aspects of the tutorial as nodes of the graph and connecting related nodes with edges of the graph. For example, the suggestion system represents a procedure of the tutorial as a first node and an editing tool for performing the procedure as a second node connected to the first node. In this example, the suggestion system represents a document having the tutorial as a third node connected to the first node. In another example, the suggestion system represents additional aspects of the tutorial as nodes and connects these nodes to related nodes. Examples of these additional aspects include words of a title of the tutorial, shortcuts for selecting editing tools described in the tutorial, and so forth.

After forming the knowledge graph, the suggestion system generates the knowledge graph embedding vectors by embedding the knowledge graph using a graph embedding method. Example graph embedding methods include node2vec, DeepWalk, etc. These graph embedding methods assign embedding vectors to nodes of the knowledge graph such that neighboring nodes of the graph are assigned similar embedding vectors. For example, embedding vectors assigned to the neighboring nodes have high cosine similarity.

The suggestion system generates an indication of an item to suggest by computing a dot product between the input embedding vectors and the knowledge graph embedding vectors. For recommendations, the suggestion system applies a time decaying weight to a result of the dot product which applies a higher weight to recent interactions and a lower weight to older interactions described by the input embedding vectors. For search suggestions, the suggestion system does not apply the time decaying weight and instead applies an equal weight to the interactions described by the input embedding vectors. The suggestion system displays the indication of the item in a user interface of the application for editing digital content.

Since the knowledge graph embedding vectors are generated without any user data, the described systems are capable of recommending items in "cold start" scenarios. This improves conventional machine-learning based suggestion systems which are not capable of generating indications of relevant items to suggest when training data is not available. Additionally, the described systems suggest items by computing a dot product between vectors which is computationally efficient and further improves conventional systems that are computationally expensive.

Because the knowledge graph embedding vectors are usable for both recommendations and search suggestions, the described systems generate suggestions for multiple different types of items. This further improves conventional machine-learning based suggestion systems which are trained on training data (if available) to generate indications of relevancy for a specific type of item. Additionally, since the described systems do not require any training data or any user data other than data describing a user's interactions with the application for editing digital content, the described systems are capable of implementation over a network (e.g., via "the cloud") or locally on a computing device of the user with or without a connection to the network.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and suggestion module 110. The storage device 108 is illustrated to include embedding data 112 that describes knowledge graph embedding vectors generated from nodes of a knowledge graph. For example, the knowledge graph describes a tutorial for editing digital content. In this example, a structure of the knowledge graph encodes relationships between aspects of the tutorial such as relationships between documents, procedures, objectives, tools, and so forth.

The environment 100 includes a server device 114 which is also connected to the network 104. For example, the computing device 102 receives data communicated by the server device 114 via the network 104 and the server device 114 receives data communicated by the computing device 102 via the network 104. Although the suggestion module 110 is illustrated to be included in the computing device 102, in some examples, the suggestion module 110 is included in the server device 114. In these examples, the server device 114 implements the suggestion module 110 and communications with the computing device 102 via the network 104 to expose functionality of the suggestion module 110 to the computing device 102.

The suggestion module 110 is illustrated as having, receiving, and/or transmitting input data 116 which describes user interactions with an application for editing digital content. For example, the input data 116 describes editing tools used and search queries entered by a user of the application for editing digital content. In this example, the editing tools are used and the search queries are entered as part of editing a digital image 118 which is displayed in a user interface 120 of the display device 106.

In one example, the suggestion module 110 receives the input data 116 directly from an input device such as a mouse, stylus, touchscreen, microphone, and so forth. In this example, a user interacts with the input device to perform editing operations on the digital image 118 using the application for editing digital content. In other examples, the suggestion module 110 receives the input data 116 indirectly from the input device such as in examples in which the suggestion module 110 is implemented by the server device 114.

A menu 122 of the application for editing digital content is displayed in the user interface 120 which includes example submenus "Insert," "Tools," "Design," "Review," and "Help." For example, the user manipulates the input device to interact with the menu 122 which exposes functionality available to the application for editing digital content such as editing tools, autocorrection algorithms, tutorials for using editing tools, and so forth. A search field 124 of the application for editing digital content is also displayed in the user interface 120. As shown, the user enters search queries in the search field 124 to perform keyword searches for digital content, tutorials describing use of the editing tools of the application, recommended editing tools for performing a particular digital content editing operation, etc.

The input data 116 describes the user's interactions with the application for editing digital content including interactions with the menu 122 and the search field 124. The suggestion module 110 leverages the embedding data 112 and the input data 116 to generate a recommendation 126 and search suggestions 128, 130 which are each displayed in the user interface 120. To do so, the suggestion module 110 generates input embedding vectors by vectorizing the user's interactions with the application for editing digital content described by the input data 116. For example, the input embedding vectors represent the user's interactions with the application in a latent space. The suggestion module 110 also processes the embedding data 112 and extracts knowledge graph embedding vectors from the embedding data 112. The knowledge graph embedding vectors are generated from nodes of a knowledge graph describing a tutorial for editing digital content.

To generate the recommendation 126, the suggestion module 110 computes a dot product between the input embedding vectors and the knowledge graph embedding vectors. The suggestion module 110 then applies a weight to a result of the dot product which is a time decaying weight in one example. In this example, a weight applied to recent interactions with the tools and submenus of the menu 122 is greater than a weight applied to older interactions with tools and submenus of the menu 122. In this manner, the suggestion module 110 generates the recommendation 126 based more on the recent interactions and based less on the older interactions. The suggestion module 110 applies the weight to the result of the dot product to determine scores for items that indicate similarity between the input embedding vectors and the knowledge graph embedding vectors. The recommendation 126 corresponds to an item having a highest score. As shown, the recommendation 126 displays "Try using a Quick Mask." In the illustrated example, the item having the highest score is the Quick Mask.

To generate the search suggestions 128, 130, the suggestion module 110 computes a dot product between the input embedding vectors and the knowledge graph embedding vectors. The suggestion module 110 then applies an equal weight to a result of the dot product between the input embedding vectors and the knowledge graph embedding vectors. In this example, all terms of search queries entered in the search field 124 are weighed equally; however, other examples are contemplated in which weights applied to the terms of the search queries are not equal. The suggestion module 110 uses the result of the dot product to determine scores for items that indicate similarity between the input embedding vectors and the knowledge graph embedding vectors. The search suggestions 128, 130 correspond to an item having a highest score and an item having a second highest score, respectively. As shown, search suggestion 128 displays "How to use Quick Mask" and search suggestion 128 displays "How to work with layers."

Figure 2:
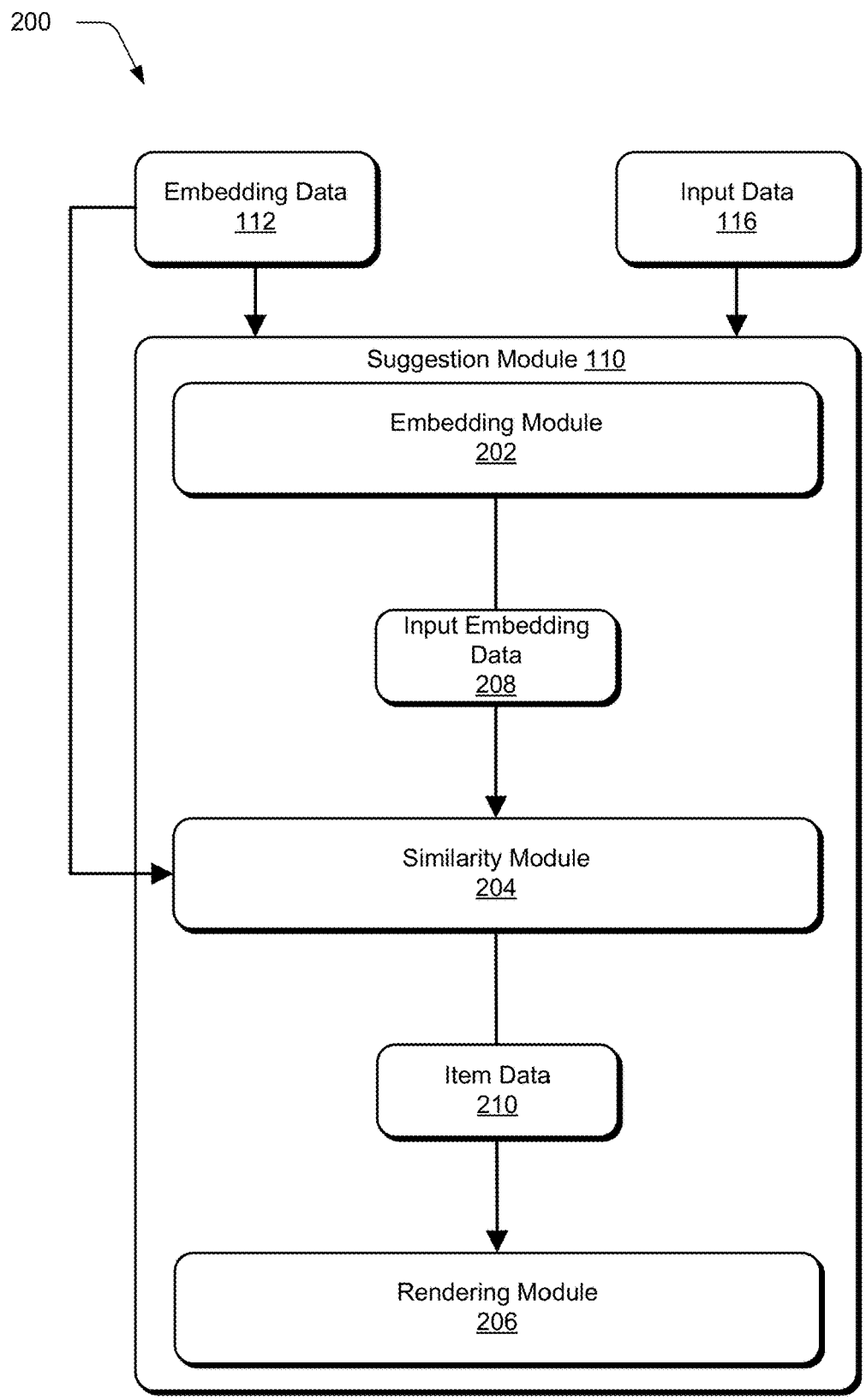
FIG. 2 depicts a system in an example implementation showing operation of a suggestion module for generation suggestions with knowledge graph embedding vectors.

FIG. 2 depicts a system 200 in an example implementation showing operation of a suggestion module 110. The suggestion module 110 is illustrated to include an embedding module 202, a similarity module 204, and a rendering module 206. The suggestion module 110 is illustrated as receiving the embedding data 112 and the input data 116 as inputs.

Figure 3A:
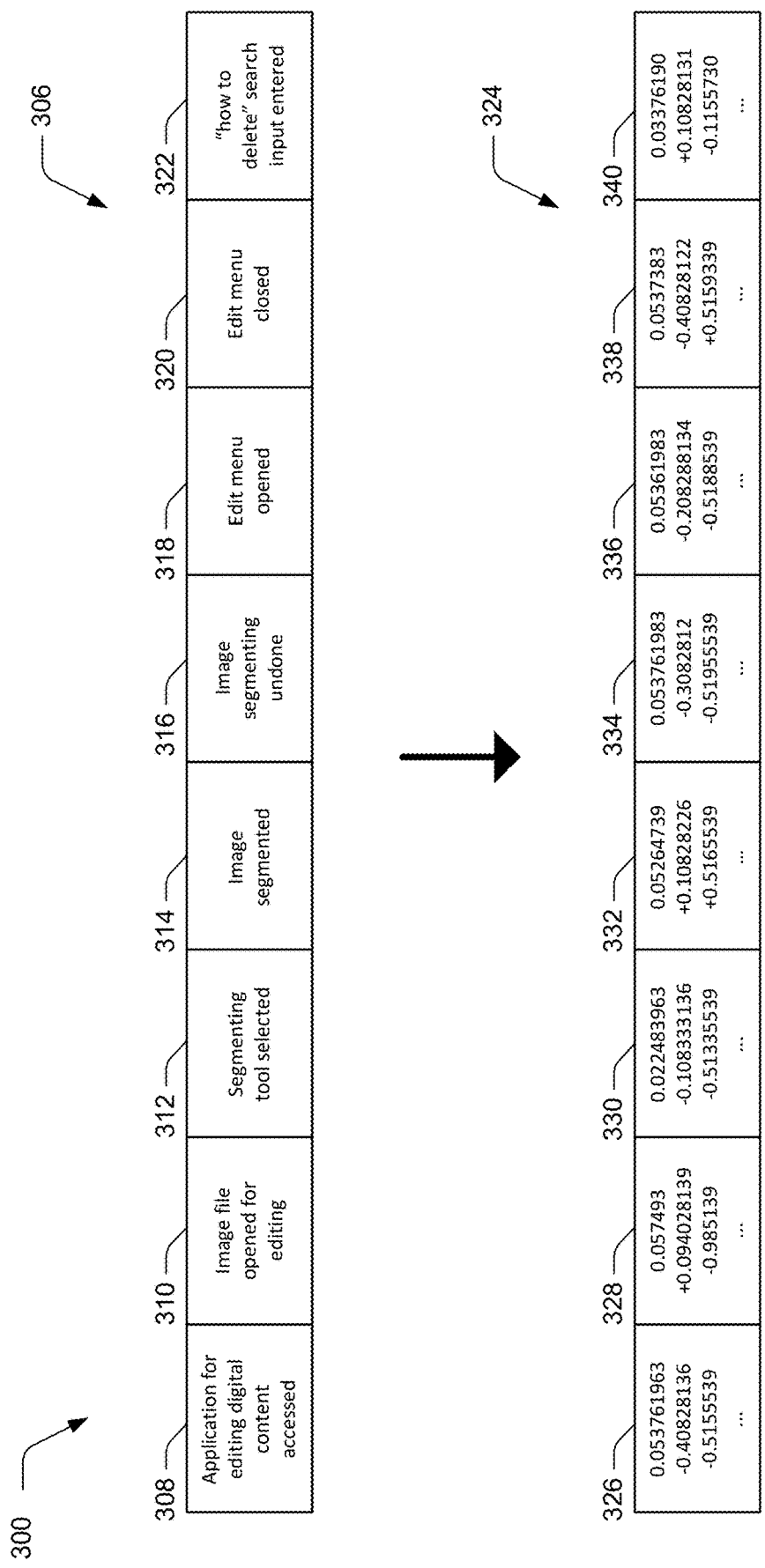
Figure 3B:
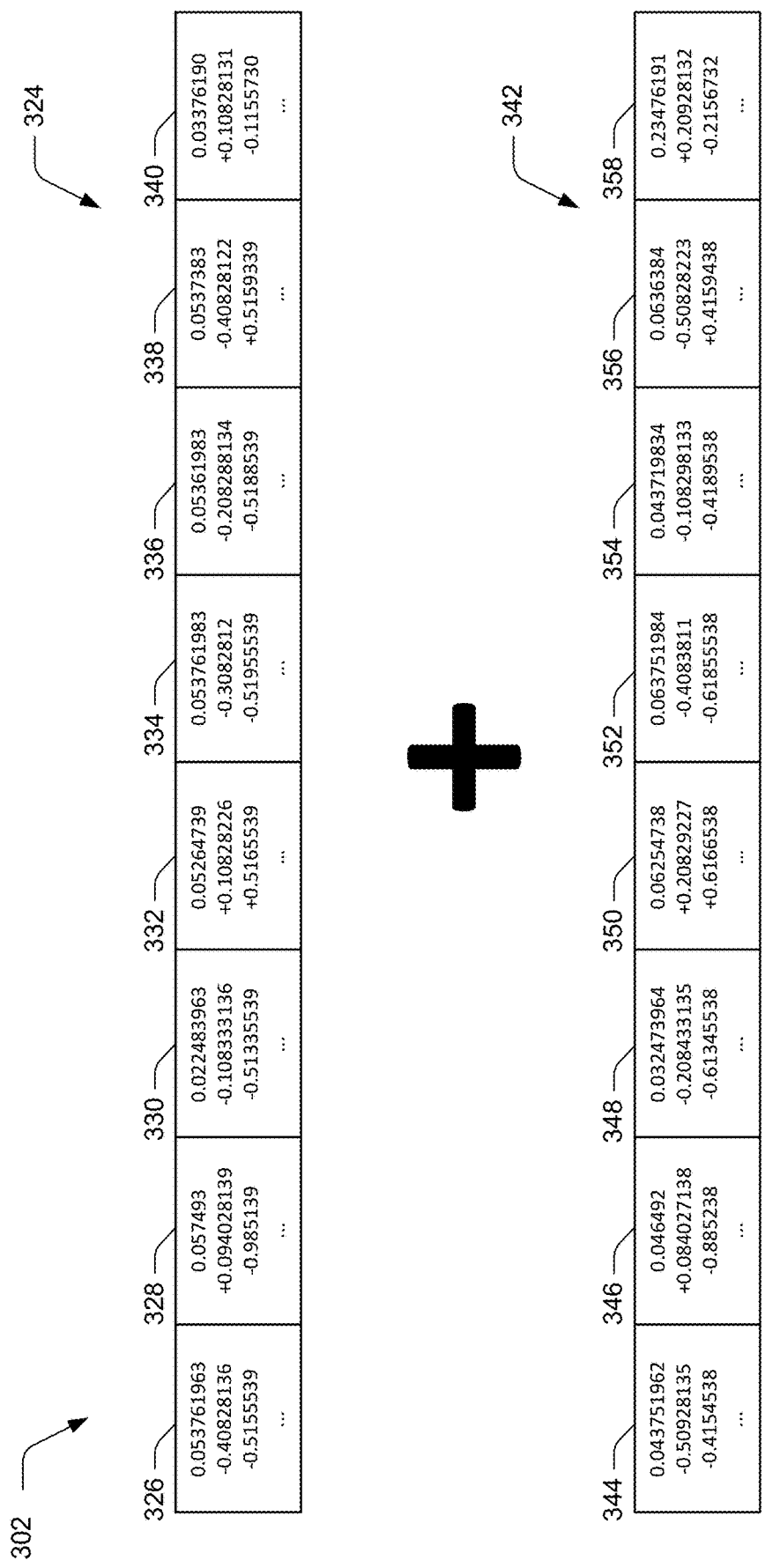
Figure 3C:
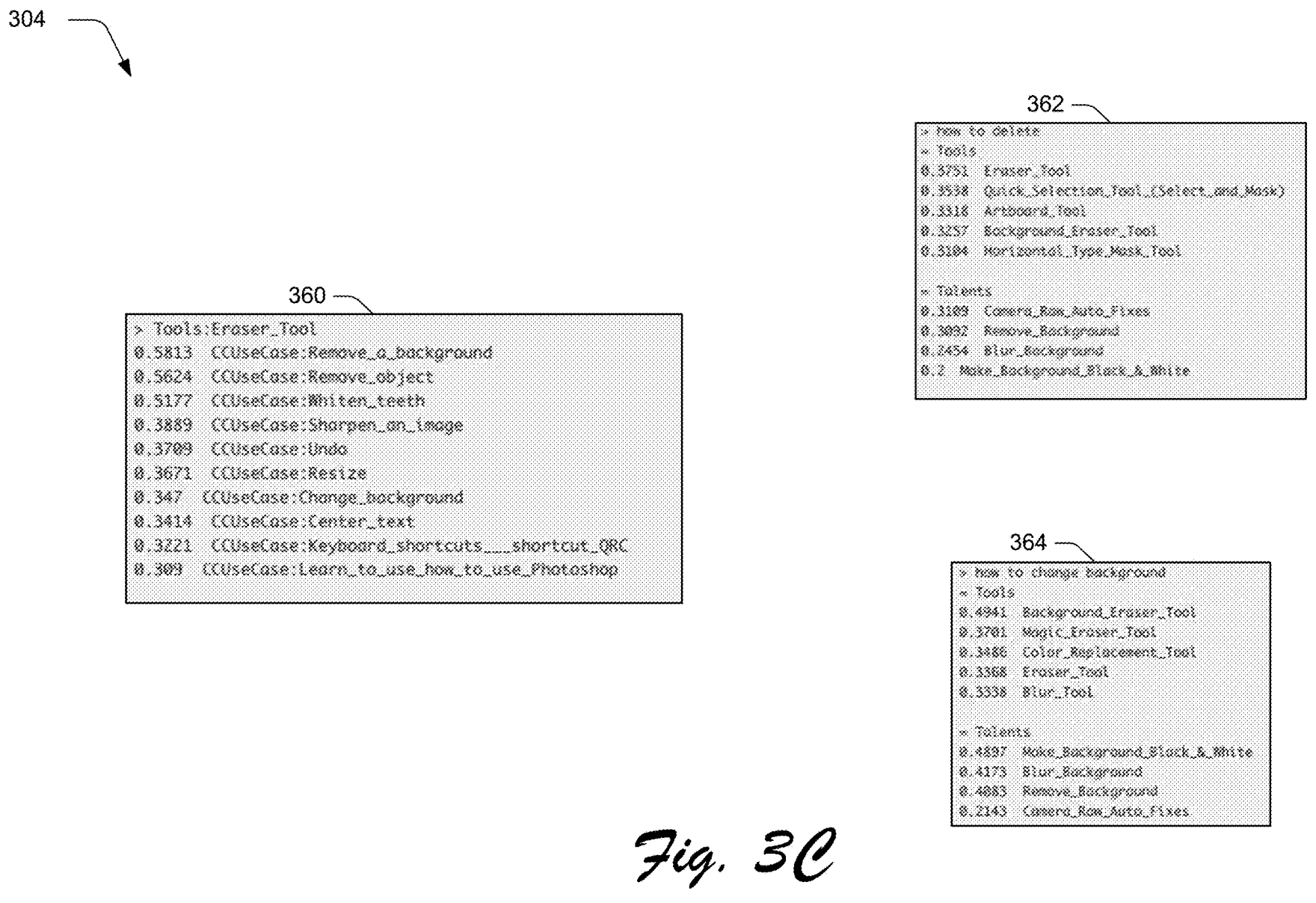

FIGS. 3A, 3B, and 3C illustrate an example of determining an item to suggest based on input embedding vectors and knowledge graph embedding vectors. FIG. 3A illustrates a representation 300 of vectorizing input data. FIG. 3B illustrates a representation 302 of a dot product between input embedding vectors and knowledge graph embedding vectors. FIG. 3C illustrates a representation 304 of example ranked lists of items including items for a recommendation and items for search suggestions.

As shown in FIG. 3A, the representation 300 includes an input data representation 306 that includes indications of interactions 308-322 with the application for editing digital content. For example, interaction 308 is an oldest interaction of the interactions 308-322 and interaction 322 is a most recent interaction of the interactions 308-322. The interaction 308 indicates "Application for editing digital content accessed" and interaction 310 indicates "Image file opened for editing."

Interaction 312 indicates "Segmenting tool selected" and interaction 314 indicates "Image segmented." Accordingly, the user of the application for editing digital content has opened an image file of a digital image and performed a segmentation operation on the digital image using the segmenting tool. Interaction 316 indicates "Imaging segmenting undone." In this example, the user was not satisfied with the segmentation operation on the digital image and interacted with the application for editing digital content to undo the segmentation operation.

Interaction 318 indicates "Edit menu opened" which suggests that the user is interacting with the menu 122 to identify a different tool of the application for editing digital content to perform an editing operation on the digital image. For example, the user is interacting with the menu 122 to perform an editing operation on the digital image which the user previously attempted to perform with the segmenting tool. Interaction 320 indicates "Edit menu closed." The interaction 322 indicates "'how to delete' search input entered" which suggests that the user is interacting with the search field 124 to learn how to delete a portion of the digital image.

As illustrated in FIG. 2, the embedding module 202 receives the input data 116 which describes the interactions 308-322 with the application for editing digital content in one example. The embedding module 202 processes the input data 116 to generate input embedding data 208 which describes input embedding vectors 324. As shown in FIG. 3A, the input embedding vectors 324 includes embedding vectors 326-340. Each of the embedding vectors 326-340 is a vector representation of the interactions 308-322, respectively. For example, the embedding module 202 vectorizes the interactions 308-322 as the embedding vectors 326-340 and generates the input embedding data 208 as describing the input embedding vectors 324.

The similarity module 204 receives the input embedding data 208 and the embedding data 112 and processes the input embedding data 208 and/or the embedding data 112 to generate item data 210. The embedding data 112 describes knowledge graph embedding vectors 342 which are illustrated in FIG. 3B. The knowledge graph embedding vectors 342 include embedding vectors 344-358 which are generated from nodes of a knowledge graph describing a tutorial for editing digital content. The similarity module 204 computes a dot product between the input embedding vectors 324 and the knowledge graph embedding vectors 342. In one example, computing this dot product is representable as:

$$\text{score}(y_i) = \sum_j (v_j \cdot t_i) * \text{weight}(j)$$

where: $v_1, v_2, \ldots, v_n$ are input embedding vectors generated from user interactions with an application for editing digital content; $y_i$ are items such as recommendations and search suggestions; $t_i$ are knowledge graph embedding vectors corresponding to each of the $y_i$ items; $v_j \cdot t_i$ is a dot product between each of $v_j$ and $t_i$, indicating a similarity between the two vectors; and weight(j) is equal to 1 for search suggestions and is equal to a time decaying function for recommendations.

The similarity module 204 uses results of the dot product between each $v_j$ and $t_i$ to generate scores for items and lists the items in a ranked order based on the scores. Examples of ranked lists of items are illustrated in the representation 304 depicted in FIG. 3C. As shown, the representation 304 includes ranked lists 360-362. Ranked list 360 includes items for a recommendation generated for an "eraser tool." Ranked list 362 includes items for a search suggestion for a search query "how to delete." Ranked list 364 also includes items for a search suggestion but for a search query "how to change background." For example, the similarity module 204 generates the item data 210 as describing the ranked lists 360-362. The rendering module 206 receives the item data 210 and processes the item data 210 to render indications of recommendations such as the recommendation 126 and search suggestions such as the search suggestions 128, 130.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
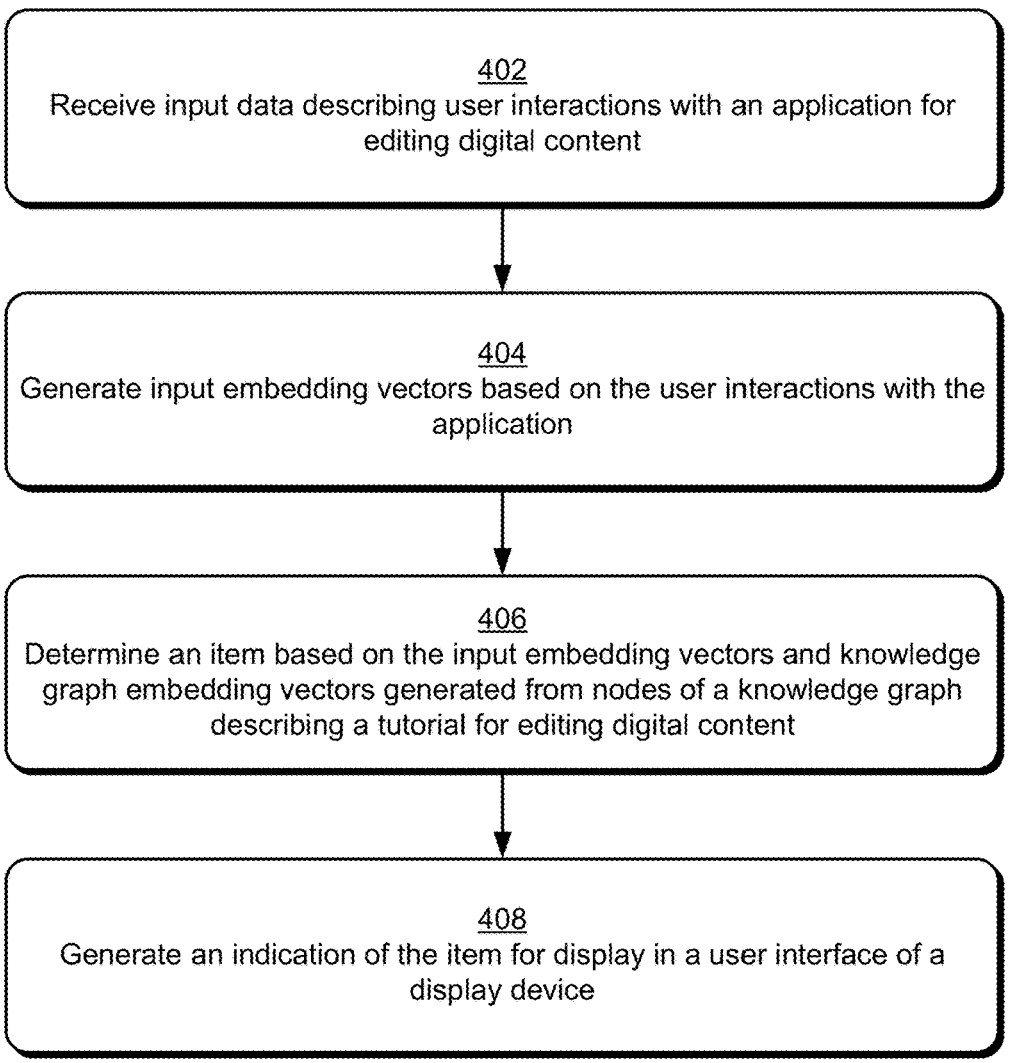
FIG. 4 is a flow diagram depicting a procedure in an example implementation in which input data describing user interactions with an application for editing digital content is received and an indication of an item is generated for display in a user interface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which input data describing user interactions with an application for editing digital content is received and an indication of an item is generated for display in a user interface.

Input data describing user interactions with an application for editing digital content is received (block 402). The computing device 102 implements the suggestion module 110 to receive the input data in one example. Input embedding vectors are generated based on the user interactions with the application (block 404). For example, the suggestion module 110 generates the input embedding vectors.

An item is determined based on the input embedding vectors and knowledge graph embedding vectors generated from nodes of a knowledge graph describing a tutorial for editing digital content (block 406). In one example, the computing device 102 implements the suggestion module 110 to determine the item based on the input embedding vectors and the knowledge graph embedding vectors. An indication of the item is generated for display in a user interface of a display device (block 408). In another example, the suggestion module 110 generates the indication of the item for display in the user interface.

Figure 5B:
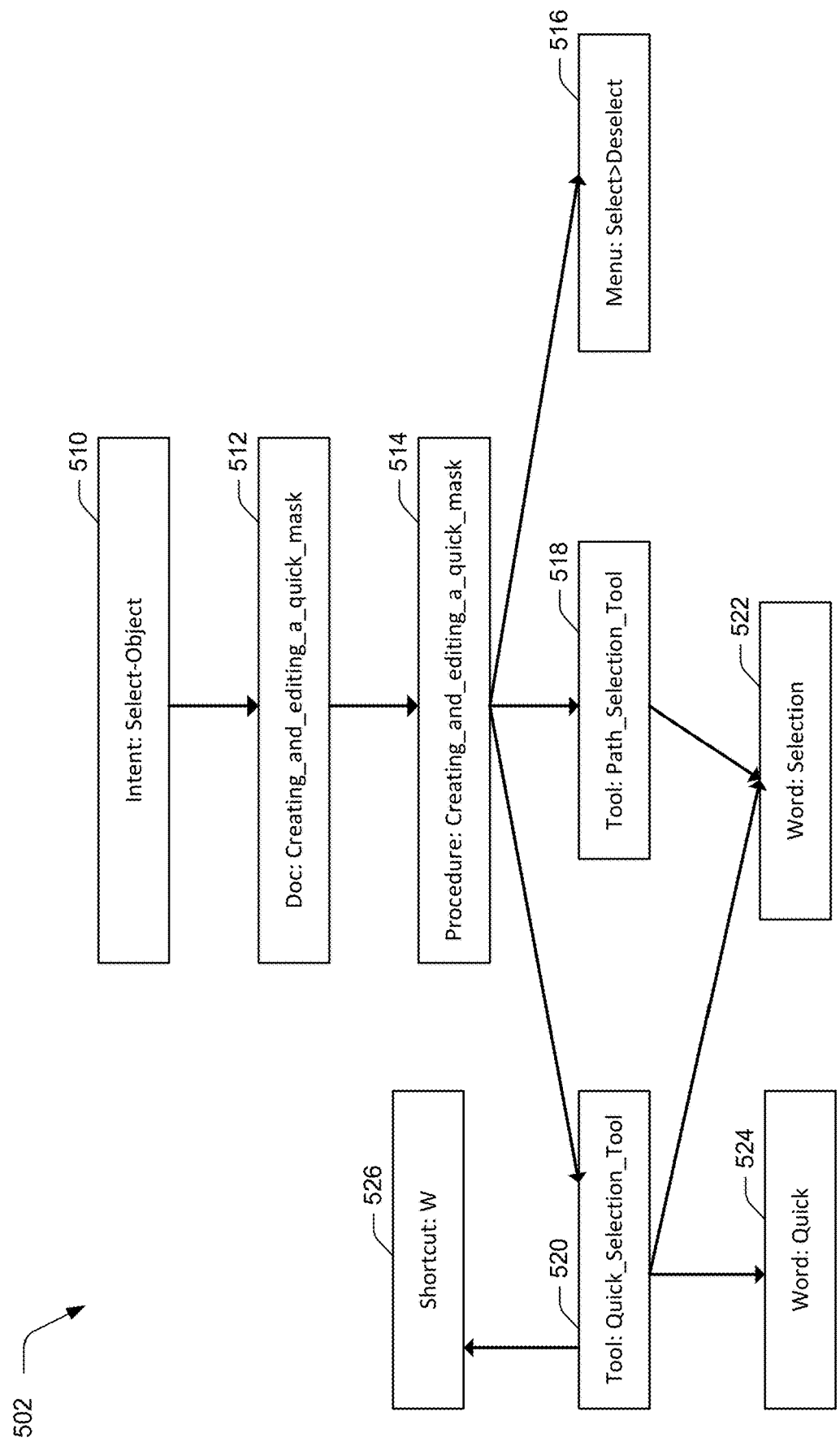
Figure 5C:
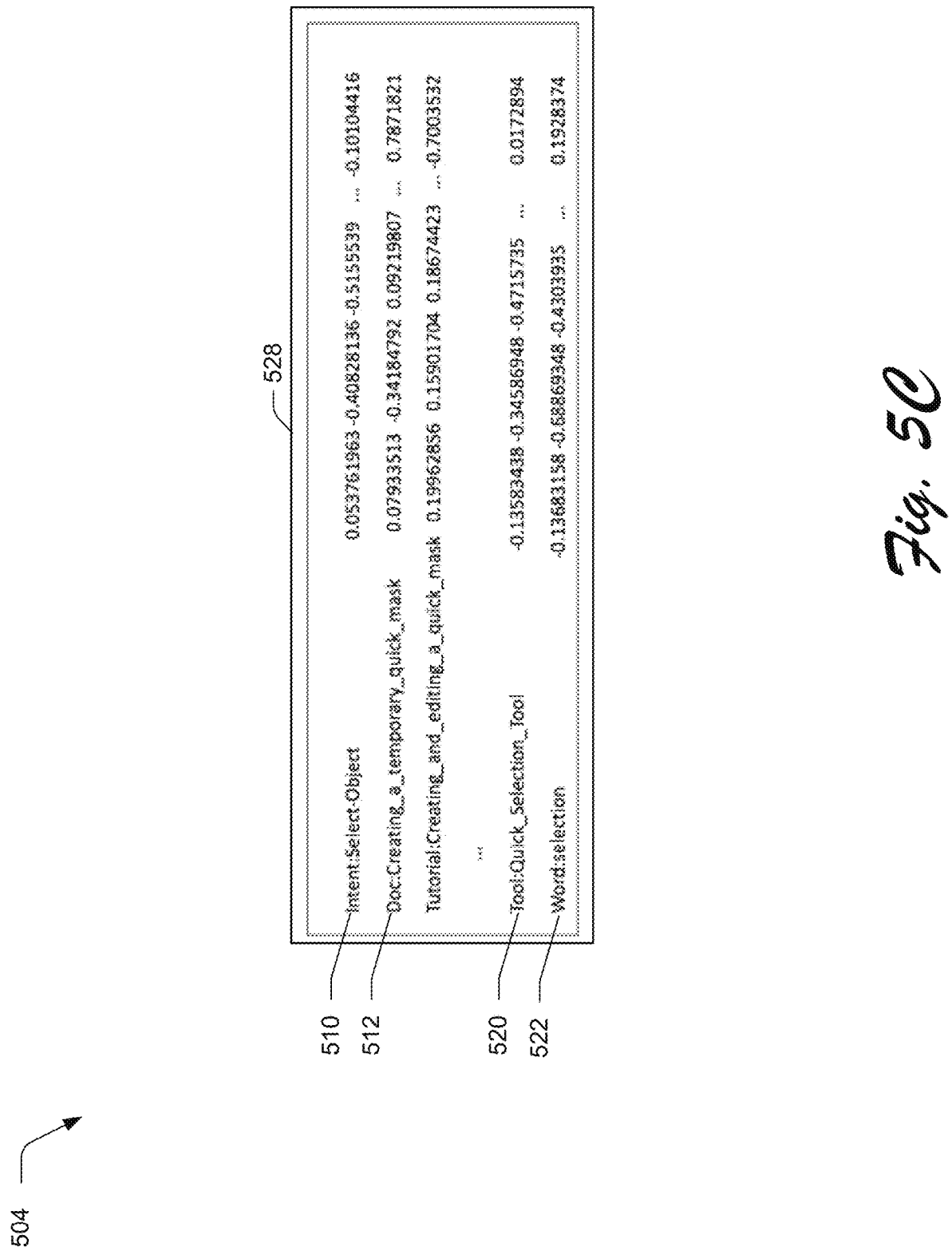

FIGS. 5A, 5B, and 5C illustrate an example of generating knowledge graph embedding vectors. FIG. 5A illustrates a representation 500 of a tutorial. FIG. 5B illustrates a representation 502 of a knowledge graph describing the tutorial. FIG. 5C illustrates a representation 504 of generating the knowledge graph embedding vectors. As shown in FIG. 5A, the representation 500 includes a tutorial 506. The tutorial 506 has a title 508 which is "Creating and editing a quick mask." As further shown, the tutorial 506 has been modified from its original format to filter out unnecessary information. For example, digital images depicting tutorial steps have been removed. In another example, tutorial steps 3-6 have also been removed. The original tutorial has been modified such that the tutorial includes relational information between aspects of the tutorial which are representable as nodes and edges of a knowledge graph.

Relationship Examples

As used herein the term "document" refers to a document that includes a tutorial for editing digital content. In one example, a document includes a single tutorial for editing digital content. In another example, a document includes multiple tutorials for editing digital content.

As used herein the term "procedure" refers to a portion of a tutorial that describes a digital content editing objective and at least one step for accomplishing the editing objective. In a first example, a procedure includes a single step for accomplishing a digital content editing objective. In a second example, a procedure includes multiple steps for accomplishing a digital content editing objective. In one example, a tutorial includes a single procedure. In another example, a tutorial includes multiple procedures.

Procedure-Tool Relationships

A procedure of a tutorial references tools usable for performing steps to accomplish the procedure's objective. The procedure and the tools are represented as nodes of a knowledge graph and relationships between the procedure and the tools are encoded as edges of the graph that connect the related nodes. The tutorial 506 has a procedure which includes an objective defined as "Creating and editing a quick mask." Accordingly, a knowledge graph describing the tutorial 506 includes a node representing this procedure.

The tutorial 506 includes a step for accomplishing the objective of the procedure which recites "Using any selection tool (Quick Selection Tool, Path Selection Tool, Direct Selection Tool), select the part of the image you want to change." This step references three tools. Accordingly, the knowledge graph includes a node representing the Quick Selection Tool, a node representing the Path Selection Tool, and a node repressing the Direct Selection Tool. Each of these three nodes are connected to the node representing the procedure of the tutorial 506 by an edge of the knowledge graph.

Procedure-to-Document Relationships

The knowledge graph includes a node representing a document which includes the tutorial 506. This node is connected to the node representing the procedure by an edge of the knowledge graph.

Intention-to-Document Relationships

An intention is broad objective which is defined by a domain expert. Examples of intentions include "how to make a collage," "how to crop," "how to remove background," and so forth. The knowledge graph includes a node representing an intention which is manifested by following procedures of tutorials. This node is connected to the node representing the document by an edge of the knowledge graph.

Word-to-Node Relationships

Words included in the intention and the title 508 of the tutorial 506 are each represented by a node of the knowledge graph. These word nodes are connected to other nodes that include the words represented by the word nodes by edges of the knowledge graph. For example, the title 508 includes the word "quick." Accordingly, the knowledge graph includes a node representing the word "quick." The node representing the Quick Section Tool also includes the word "quick." Thus, these two nodes are connected by an edge of the knowledge graph.

Attribute Information

The knowledge graph captures and includes attributes of each node. For example, the Quick Selection Tool has a shortcut such that a "W" keystroke causes selection of the Quick Selection Tool. The knowledge graph includes a node representing the "W" keystroke and this node is connected to the node representing the Quick Selection Tool by an edge of the knowledge graph.

Other Nodes

The knowledge graph is not limited to representing relationships between the particular examples described herein. In some examples, the knowledge graph includes personalized nodes based on user behavior or user classifications determined to include the user. In other examples, the knowledge graph includes nodes representing plugins which perform complex actions such as automatically blurring a background of a digital image, automatically fixing any blur issue depicted in the digital image, and so forth. Other types of nodes are also contemplated such as nodes which have been generated by machine learning models to further personalize suggestions such as recommendations and search suggestions.

As shown in FIG. 5B, the representation 502 includes a portion of a knowledge graph that describes the tutorial 506. The portion of the knowledge graph includes nodes 510-526. Node 510 represents an intention of "Select-Object" and node 512 represents a document including the tutorial 506. For example, this document is named "Creating and editing a quick mask." The node 510 and the node 512 are connected by an edge of the knowledge graph because the nodes 510, 512 are related by an intention-to-document relationship.

Node 514 represents a procedure of the tutorial 506. This procedure includes an objective and/or a title of "Creating and editing a quick mask." The node 514 is connected to the node 512 by an edge of the knowledge graph because nodes 512, 514 are related by a procedure-to-document relationship. Nodes 516-520 represent tools for accomplishing an objective of the procedure represented by the node 514. For example, node 516 represents the Direct Selection Tool, node 518 represents the Path Selection Tool, and node 520 represents the Quick Selection Tool. Each of the nodes 516-520 is connected to the node 514 by an edge of the knowledge graph because the nodes 516-520 and the node 514 are related by a procedure-tool relationship.

By connecting the nodes 516-520 to the node 514 in the portion of the knowledge graph in this manner, each of the nodes 516-520 is represented as a 1-hop neighbor of the node 514 and each one of the three nodes 516-520 is also represented as a 2-hop neighbor of the other two nodes.

Node 522 represents the word "Selection." For example, a variation of the word "Selection" is included in the node 512 which represents the intention "Select-Object." The word "Selection" is also included in the Path Selection Tool represented by the node 518 as well as in the Quick Selection Tool represented by the node 520. Accordingly, the nodes 518, 520 are connected to the node 522 by edges of the knowledge graph based on word-to-node relationships.

Node 524 represents the word "Quick" because this word is included in the title 508 of the tutorial 506. The word "Quick" is also included in the Quick Selection Tool represented by the node 520. Thus, the node 524 is related to the node 520 by a word-to-node relationship and the nodes 520, 524 are connected by an edge of the knowledge graph. Node 526 represents the shortcut "W." In one example, the shortcut "W" selects the Quick Selection Tool represented by the node 520. The nodes 520, 526 are connected by an edge of the knowledge graph because the nodes 520, 526 are related by attribute information.

As shown in FIG. 5C, the representation 504 includes knowledge graph embedding vectors 528 generated from the nodes 510-526 of the portion of the knowledge graph. For example, the suggestion module 110 generates the knowledge graph embedding vectors 528 using a graph embedding method such as node2vec which generates vector representations of nodes of a graph. In one example, the suggestion module 110 generates the knowledge graph embedding vectors 528 using DeepWalk.

The suggestion module 110 generates the knowledge graph embedding vectors 528 based on a structure of the knowledge graph. In this way, the relationships between the nodes 510-526 are encoded in the knowledge graph embedding vectors 528. For example, the suggestion module 110 generates the knowledge graph embedding vectors 528 such that neighboring nodes of the knowledge graph are assigned similar embedding vectors. In this example, related nodes of the knowledge graph are assigned embedding vectors which have high cosine similarity. This cosine similarity is representative of the relationship between the nodes of the knowledge graph.

Since the relationships between the nodes 510-526 are based on information described in the tutorial 506, the knowledge graph embedding vectors 528 also represent the information described in the tutorial 506. Accordingly, by using the knowledge graph embedding vectors 528 to generate suggestions, the suggestion module 110 generates the suggestions (e.g., recommendations, search suggestions, etc.) based on the information included in the tutorial 528. Although this example is described in terms of a portion of a knowledge graph based on the tutorial 506, it is to be appreciated that the knowledge graph embedding vectors 528 are capable of being generated based on a knowledge graph that describes multiple tutorials or based on multiple knowledge graphs.

Example Improvements

The described systems for generating suggestions with knowledge graph embeddings were evaluated against baseline techniques for performing a tool search task. The objective of the tool search task is to return relevant editing tools given a search query. For example, given a test query of "smart selection tool," the objective of the tool search task could be achieved by returning the Quick Selection Tool.

A dataset was generated for the tool search task using MTurk workers. The dataset was processed such that an MTurk worker provided phrase is used as a test query and the tool shown to the MTurk worker is used as a ground-truth tool. The baseline techniques considered were BM25, embedding-based, and fuse.js which is a JavaScript search library. Accuracy was defined as:

$$\text{Accuracy@}k = \frac{\text{number of cases where the tround - truth ranked with top } k}{\text{total number of queries}}$$

Accuracy was measured at k=1 and k=3. The results of the evaluation are presented in the following table.

| Method | Accuracy at k = 1 | Accuracy at k = 3 |
|---|---|---|
| BM25 | 0.450 | 0.632 |
| Embedding-Based | 0.433 | 0.644 |
| fusejs | 0.420 | 0.544 |
| Described Systems | 0.683 | 0.866 |

As shown in the above, the described systems for generating suggestions using knowledge graph embedding vectors demonstrate superior performance relative to the three baseline techniques evaluated.

Example System and Device

Figure 6:
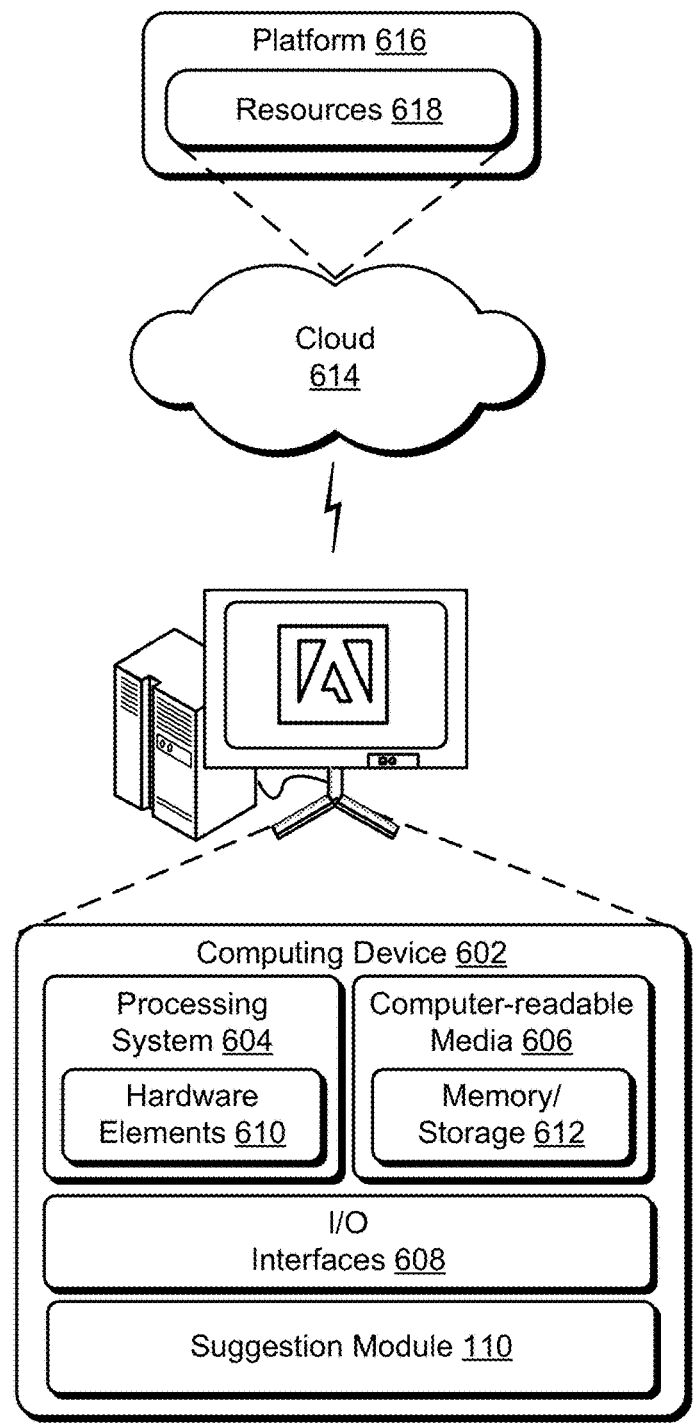
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the suggestion module 110. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are be configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage component 612 includes volatile media (such as random access memory (RAM)) and/or nonvolatile media (such as read only memory (ROM), Flash memory, optical disks, magnetic disks, and so forth). In another example, the memory/storage component 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of systems for generating suggestions with knowledge graph embedding vectors have been described in language specific to structural features and/or methods, it is to be understood that the appended claims are not necessarily limited to the specific features or methods described. Rather, the specific features and methods are disclosed as example implementations of systems for generating suggestions with knowledge graph embedding vectors, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a computing device, the method comprising:
receiving, by the computing device, input data describing user interactions with an application for editing digital content;
generating, by the computing device, input embedding vectors based on the user interactions with the application;
determining, by the computing device, an item based on the input embedding vectors and knowledge graph embedding vectors generated from nodes of a knowledge graph describing a tutorial for editing digital content, the tutorial is included in a document and the tutorial has a title and a procedure that describes how to use a digital content editing tool to perform a digital content editing objective and a structure of the knowledge graph encodes relationships between the document, the procedure, the digital content editing tool, a shortcut for the digital content editing tool, a menu of editing tools, the digital content editing objective, and a word included in a title of the digital content editing objective, a title of the document, or a title of the procedure; and
generating, by the computing device, an indication of the item for display in a user interface of a display device, the item is a search suggestion or a recommendation.

2. The method as described in claim 1, wherein the nodes of the knowledge graph include a procedure node corresponding to the procedure, a tool node corresponding to the digital content editing tool, and a menu node corresponding to the menu of editing tools and wherein the procedure node is connected to the tool node and the menu node in the knowledge graph.

3. The method as described in claim 1, wherein the nodes of the knowledge graph include a document node corresponding to the document and a procedure node corresponding to the procedure and wherein the document node is connected to the procedure node in the knowledge graph.

4. The method as described in claim 1, wherein the nodes of the knowledge graph include an objective node corresponding to the digital content editing objective and a document node corresponding to the document and wherein the objective node is connected to the document node in the knowledge graph.

5. The method as described in claim 1, wherein the nodes of the knowledge graph include a word node corresponding to the word included in the title of the digital content editing objective, the title of the document, or the title of the procedure and wherein the word node is connected to an additional node that includes the word in the knowledge graph.

6. The method as described in claim 5, wherein the additional node is a tool node corresponding to the digital content editing tool.

7. The method as described in claim 1, wherein the nodes of the knowledge graph include a tool node corresponding to the digital content editing tool and an attribute node corresponding to the shortcut for the digital content editing tool and wherein the tool node is connected to the attribute node in the knowledge graph.

8. The method as described in claim 1, further comprising:
computing a dot product between the input embedding vectors and an embedding vector for the item included in the knowledge graph embedding vectors; and
multiplying the dot product by a weight to determine the item.

9. The method as described in claim 8, wherein the weight is a time-decaying function if the item is a recommendation.

10. In a digital medium environment, a system comprising:
an embedding module implemented in hardware of a computing device to:
receive input data describing user interactions with an application for editing digital content; and
generate input embedding vectors based on the user interactions with the application;
a similarity module implemented in the hardware of the computing device to determine an item based on the input embedding vectors and knowledge graph embedding vectors generated from nodes of a knowledge graph describing a tutorial for editing digital content, the tutorial is included in a document and the tutorial has a title and a procedure that describes how to use a digital content editing tool to perform a digital content editing objective and a structure of the knowledge graph encodes relationships between the document, the procedure, the digital content editing tool, a shortcut for the digital content editing tool, a menu of editing tools, the digital content editing objective, and a word included in a title of the digital content editing objective, a title of the document, or a title of the procedure; and
a rendering module implemented in the hardware of the computing device to generate an indication of the item for display in a user interface of a display device, the item is a search suggestion or a recommendation.

11. The system as described in claim 10, wherein the nodes of the knowledge graph include a procedure node corresponding to the procedure and a tool node corresponding to the digital content editing tool and wherein the procedure node is connected to the tool node in the knowledge graph.

12. The system as described in claim 10, wherein the nodes of the knowledge graph include a document node corresponding to the document and a procedure node corresponding to the procedure and wherein the document node is connected to the procedure node in the knowledge graph.

13. The system as described in claim 10, wherein the nodes of the knowledge graph include an objective node corresponding to the digital content editing objective and a document node corresponding to the document and wherein the objective node is connected to the document node in the knowledge graph.

14. The system as described in claim 10, wherein the nodes of the knowledge graph include a word node corresponding to the word included in the title of the digital content editing objective, the title of the document, or the title of the procedure and wherein the word node is connected to an additional node that includes the word in the knowledge graph.

15. The system as described in claim 10, wherein the nodes of the knowledge graph include a tool node corresponding to the digital content editing tool and an attribute node corresponding to the shortcut for the digital content editing tool and wherein the tool node is connected to the attribute node in the knowledge graph.

16. One or more computer-readable storage media comprising instructions stored thereon that, responsive to execution by a computing device, causes the computing device to perform operations including:
receiving input data describing user interactions with an application for editing digital content, the user interactions including entering search queries or using editing tools;
generating input embedding vectors based on the user interactions with the application;
determining an item based on the input embedding vectors and knowledge graph embedding vectors generated from nodes of a knowledge graph describing a tutorial for editing digital content, the tutorial is included in a document and the tutorial has a title and a procedure that describes how to use a digital content editing tool to perform a digital content editing objective and a structure of the knowledge graph encodes relationships between the document, the procedure, the digital content editing tool, a shortcut for the digital content editing tool, a menu of editing tools the digital content editing objective, and a word included in a title of the digital content editing objective, a title of the document, or a title of the procedure; and
generating an indication of the item for display in a user interface of a display device, the item is a search suggestion or a recommendation.

17. The one or more computer-readable storage media as described in claim 16, wherein the nodes of the knowledge graph include a procedure node corresponding to the procedure and a menu node corresponding to the menu of editing tools and wherein the procedure node is connected to the menu node in the knowledge graph.

18. The one or more computer-readable storage media as described in claim 16, wherein the nodes of the knowledge graph include a document node corresponding to the document and a procedure node corresponding to the procedure and wherein the document node is connected to the procedure node in the knowledge graph.

19. The one or more computer-readable storage media as described in claim 16, wherein the nodes of the knowledge graph include an objective node corresponding to the digital content editing objective and a document node corresponding to the document and wherein the objective node is connected to the document node in the knowledge graph.

20. The one or more computer-readable storage media as described in claim 16, wherein the operations further include:
computing a dot product between the input embedding vectors and an embedding vector for the item included in the knowledge graph embedding vectors; and multiplying the dot product by a weight to determine the item.

\* \* \* \* \*